Nov. 23, 1954  J. G. EVERHART  2,695,137
ROUND-WOUND WINDING MACHINE

Filed Aug. 13, 1951  3 Sheets-Sheet 1

INVENTOR.
James G. Everhart
BY
Attorney

Nov. 23, 1954

J. G. EVERHART 2,695,137

ROUND-WOUND WINDING MACHINE

Filed Aug. 13, 1951

INVENTOR.
James G. Everhart
BY
Attorney

INVENTOR.
James G. Everhart

United States Patent Office 2,695,137
Patented Nov. 23, 1954

2,695,137
ROUND-WOUND WINDING MACHINE

James G. Everhart, Zanesville, Ohio, assignor to McGraw Electric Company, Milwaukee, Wis., a corporation of Delaware Application August 13, 1951, Serial No. 241,616

11 Claims. (Cl. 242—4)

This invention relates to a machine for winding coils and to a method of winding coils generally used in inductive apparatus.

The transformers which are generally recognized as being superior to any other kind of transformers are those which have round coils wound on a core which is formed of a continuous spiral ribbon of flux conducting material viz. high silicon oriented steel. The round winding permits the core steel to be worked with the grain for improved magnetic efficiency. These transformers are designated by the trade-mark "Round Wound."

Large transformers have been made by the "Round Wound" method for sometime, but previously small transformers have been difficult to wind because of the limited space factor.

The object of my invention is to provide a machine and a method for winding conducting coils on a magnetic core for an electromagnetic device such, for example, as a transformer, the invention providing an anti-friction device which permits the free rotation of the coil tube about the core in such a manner that it is necessary to have only a very small clearance between the corners of the core and the coil tube while driving said tube.

Another object of my invention is to provide a method of using "Round Wound" construction on small transformers.

A further object is to provide a method of constructing a shell-type "Round Wound" transformer.

It is a further incidental to my invention which of the various drive means is used for the winding machine. It could be friction on the ends of the coil tube as shown, gears utilizing notches in the end of the coil tube, or an equalized pressure friction driven against the winding surface. However, I illustrate a friction drive on the ends of the coil tube in this embodiment of my invention.

Successful transformer winding has been attained with winding machines that hold the coil tube out of contact with the core. The coil tube is usually made of some insulating material such as wound paper that could be easily damaged if dragged across the sharp corners of the core. With this experience in mind and with the growing need for both a small transformer and a shell type "Round Wound" transformer, this invention was developed to wind such coils on the smaller transformer.

This invention holds the easily damaged coil tube out of contact with the core with the minimum amount of waste space so as to improve the inductive characteristics of the transformer, and at the same time permits its free rotation. I accomplish this by means of an anti-friction device in combination with other features described.

Figure 1:
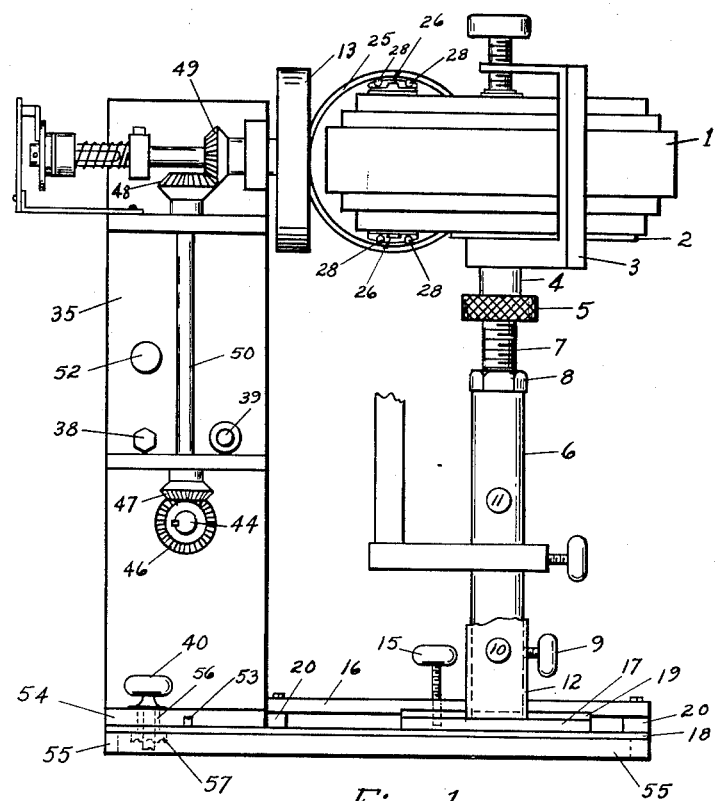
Fig. 1 is an end elevation of a coil winding machine.

Referring to Fig. 1, an end view of my machine, I position a "Round Wound" core 1 on core supports 2 by means of swivel "C" clamps 3, one support 2 under each end of the core. These supports 2 are removable from and revolubly mounted on rods 4 which have a machined surface above a knurled portion 5. The knurled portion 5 serves as a knob by which rod 4 can be raised or lowered in tubes 6 by means of a threaded portion 7 of the rod 4. The clamped core 1 can by this means be adjusted to the desired height by turning the two knobs 5 and can be locked in position by tightening nuts 8.

In clamping the core it is necessary that the two supports 2 be the proper distance apart. This adjustment is made by loosening thumb screws 9 and moving rods 4 on guide rods 10 and 11 which are positioned by supports 12 at both ends of the horizontal guide rods 10 and 11.

The clamped core 1 may be positioned between drive rollers 13 and 14 by moving the core forward or backward as necessary. Loosening of a thumb screw 15 located in a guide bar 16 permits the positioning of a core support base 17. This base can slide to left or right between a main winding machine base 18 and the guide bar 16. Two bars 19 on the support base 17 limit movement of the base 17 with respect to guide bar 16. The guide bar 16 is raised above the base 18 an amount just slightly more than the thickness of the base by spacers 20. The actual winding of the conductor on the coil tube 25 is accomplished in the usual manner well-known in the prior art and as such, forms no part of this invention for it may be accomplished in a variety of ways well-known to anyone skilled in the art.

Figure 2:
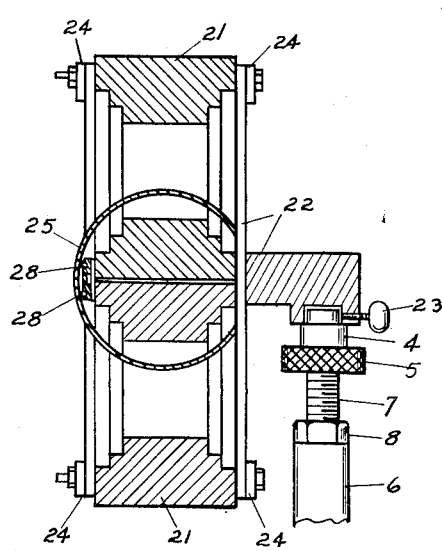
Fig. 2 is a sectional view of an alternate core of the shell type that can be mounted in the machine.

In Fig. 2 I show in section an alternate for core 1 in a shell type core consisting of two "Round Wound" cores 21 mounted in the winding machine. The two cores 21 are mounted on a support 22 which is removable from and revolubly mounted on the rod 4. A thumb screw 23 can be used to tighten the support 22 to the rod 4. Adequate straps 24 with their respective nuts and bolts complete the clamping arrangement.

A coil tube 25 has previously been assembled around the core leg. These tubes can be made in any one of various ways. It would be desirable to use a coil tube that was wound directly on the core. However, this is difficult to make and at the same time attain a tube with the following qualifications. The tube must be strong enough to resist deformation from the circular; the inner hole must be round within reasonable tolerances; the inner surface must be free from irregularities that might cause the tube to catch or bind or in any way retard its free rotation; and the dielectric strength must be sufficient for the particular electrical design. Further, the coil must be in optimum space relationship with the core of the transformer.

Two successful methods of making tubes are to make them of a laminated phenolic or of a dielectrically strong material spirally wound to the necessary thickness. Both of these methods are satisfactory, however, the phenolic is expensive and the latter is not. The necessary thickness of the latter may be obtained by successive layers having the ribbon of material spiralled so that the edges of the ribbon cover the spiral joint of the preceding layer. This type of tube may have cemented layers; it may be impregnated with varnish or similar substances, or given any other treatment that will give the desired results. The preformed coil tube can be cut and assembled around the core with some fastening means such as Glyptol cement. The saw or cutting means should remove only a minimum amount of material as the tube must be as near to round as possible. If the tube is cut at an angle, it is easier to cement together and it has greater strength than if a butt joint is used.

Figure 7:
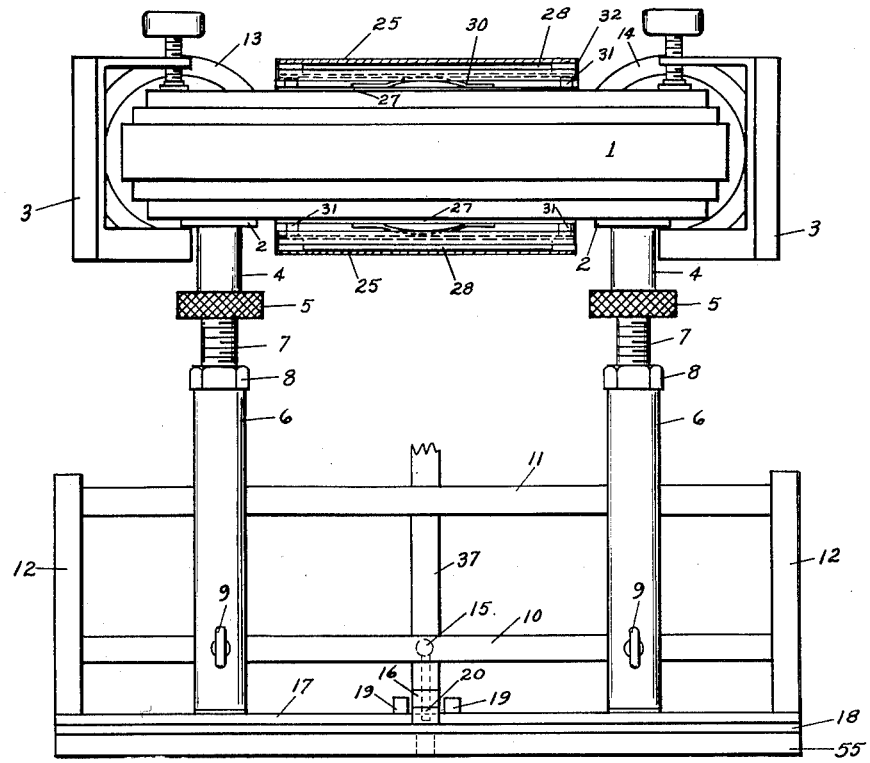
Fig. 7 is a rear elevation of the coil winding machine.

The coil tube 25 is supported about the core 1 by two roller bearing devices 26 as shown in this embodiment, however, an equivalent anti-friction device may be used. This is placed between the coil tube 25 and the upper and lower faces of the core 1 as shown in Fig. 1. The roller bearing devices are placed so that the coil tube 25 rotates freely about the core 1. If it should seem necessary because of wire tension or the size of the wire to clamp the roller bearing device in position this can be done by fastening a base plate 27 with any fastening means that is convenient. The base plate 27 fits along the length of the core face as can be seen in Fig. 7.

Figure 4:
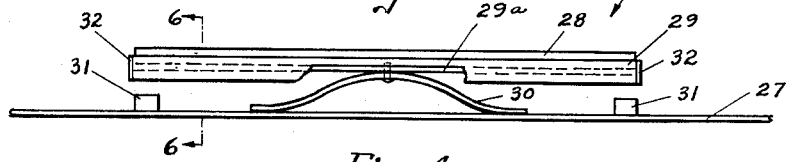
Fig. 4 is an elevation of an apparatus for a roller-bearing device.
Figure 6:
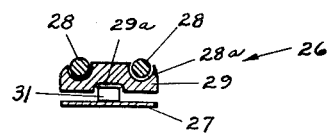
Fig. 6 is a section taken on the line 6—6 of Fig. 4.

The roller bearing device 26 shown in detail in Figs. 4 and 6 consists of two roller bearings 28 free to revolve in position in a bearing roll 28a which may or may not support the bearing through its whole length. In Fig. 4 the bearing is supported throughout its length but friction can be reduced by lessening the area of contact between the bearing and the races. A bearing holder 29 has a keyway 29a on its under side to which is fastened a spring 30 at its mid-section. The keyway also acts as a guide for stops 31 which prevent side motion of bearing holder 29 and limit the compression of the spring 30. End plates 32 prevent any length-wise shifting of the bearing holder 29 in relation to the base 27.

This roller bearing device should not be limited to any definite number of rollers. One, two, three or more bearings in each device will work but with differing degrees of effectiveness under special conditions. Three bearings would require a different device for each differing diameter of coil tube. With either one or two roller bearings, the same device can be used with practically any diameter core tube provided the distance between the core and inside of coil tube along the center line is approximately the same. In most cases, the two roller device is preferable. However, it is to be noted that an equivalent anti-friction device which has the space saving characteristic may be used.

Figure 3:
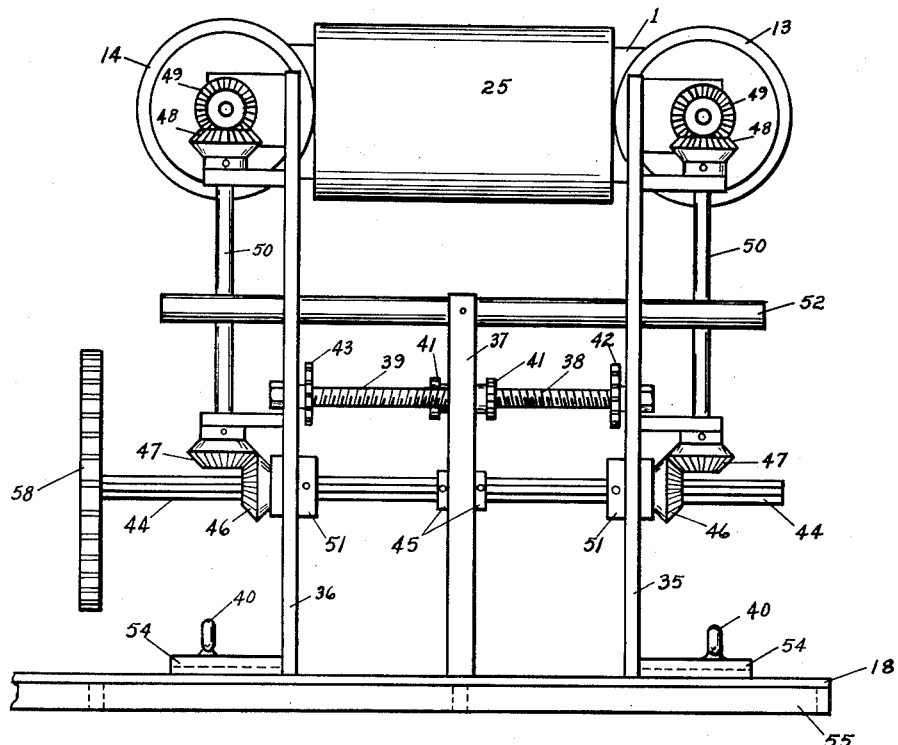
Fig. 3 is a front elevation of the coil winding machine.

The coil tube 25 supported by the roller bearing device 26 is rotated about the core 1 by rollers 13 and 14 acting through friction against the ends of the coil tube 25. This can be seen in Fig. 3. The amount of friction can be regulated by adjusting the position of a support 35 for the roller 13 and a support 36 for the roller 14 in relation to a support 37 to which the supports 35 and 36 are connected through the threaded horizontal dimension rods 38 and 39. Another view of this relationship is shown in Fig. 1. The adjustment is made by first loosening thumb screws 40 and lock nuts 41. The turning of nuts 42 and 43 will individually position drive rollers 13 and 14 on the horizontal dimension rods 38 and 39. These rods 38 and 39 are free to turn in supports 35 and 36 and when screwed into or out of support 37 cause horizontal movement of supports 35 and 36. To wind heavier coils it is usually necessary to adjust the drive wheels so as to create greater friction.

The horizontal location of a drive shaft 44 is fixed by collars 45 attached to the shaft 44. The relation between gears 46 and 47, and gears 48 and 49 are fixed and these gears together with drive shafts 50 and drive rollers 13 and 14 move as a unit with the supports 35 and 36.

The gears 46 form part of an assembly 51 which can turn freely in the supports 35 and 36, but cannot move away from the supports. The assembly 51 is keyed to the shaft 44 for transfer of rotative motion and this keying permits the aforementioned positioning of the supports 35 and 36 and associated parts, the assemblies 51 being free to slide on the shaft 44 as the adjustment requires.

A rod 52 and a key 53 serve as guides for the horizontal movement of the supports 35 and 36. Key 53 is affixed to the winding machine base 18 and guides the movement of supports 35 and 36 by means of a keyway cut in the base plates 54 which are attached to the bottom of the supports 35 and 36.

The winding machine base 18 rests on a frame 55 and has a slot parallel to the key 53 and close to the front edge of the base 18. The thumb screws 40 pass through clearance holes 56 in base plates 54 through the slots in the base 18 and are secured on the under side of the base 18 by square nuts 57 which cannot turn due to being positioned close to the support frame 55.

A gear 58 at the end of the drive shaft 44 is driven by a variable speed motor which is not shown. This motor can have an adjustable mounting so that the gear ratio can be changed easily, making several winding speed ranges possible. This gear 58 rotates the shaft 44 which turns the gears 46 and the associated gears 47. Moving simultaneously with the gears 47 are the gears 48 and these are associated with the gears 49 which turn the drive rollers 13 and 14.

Rotation of the gear 58 in a clockwise direction when viewed from the gear 58 side of the machine results in drive roller 14 rotating in a counter-clockwise direction and drive roller 13 rotating in a clockwise direction when viewed from the front of the winding machine. This will rotate the coil tube 25 in a direction which will cause wire, when fed from the front to be wound on the coil tube.

Figure 5:
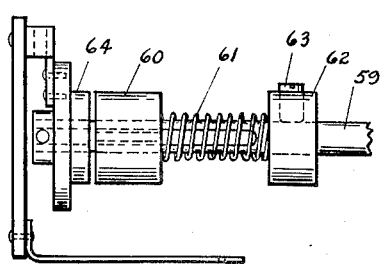
Fig. 5 is an enlarged view of a switching arrangement for winding the coils on the tube, or for unwinding the same.

In Fig. 5 I show an enlarged view of a selective switching arrangement that is also shown in the upper left side of Fig. 1. The direction of rotation of a shaft 59 is indicative of the direction of rotation of the coil tube 25.

A clutch plate 60 keyed to the shaft 59 is free to shift axially along the shaft 59 within the limits imposed by the adjustment of a spring 61 through positioning of a collar 62 which is locked in place on the shaft 59 by a set screw 63. In effect, the clutch plate 60 is held against a second clutch plate 64 by the pressure of the spring 61. As the shaft 59 rotates so does the clutch plate 64 until contact is made in either direction depending upon the direction of rotation of the shaft 59. After the conductor is wound on the coil tube 25 in the usual manner, the core and coil assembly is removed by releasing the bolt on the clamp 3 and the other leg of the core 1 will have a preformed coil tube assembled about it and fastened together. The anti-friction elements 26 are removed simply by tilting up the core and coil assembly. After the coils are wound on the legs of the transformer coil, the anti-friction elements are removed therefrom and the coil is wedged to the core in the usual manner.

This selective switching arrangement is incorporated in my "Counting Device" Patent No. 2,420,590 of May 13, 1947, where it is described and shown in greater detail and claimed therein in combination with my counting device.

It can be seen from the foregoing description that with this machine it is possible to use "Round Wound" construction on small transformers and to construct a shell-type "Round Wound" transformer by the friction drive method. The space saving anti-friction device between the coil tube and the core provides a means for easy rotation of the coil around the core and at the same time is able to do it with the minimum of clearance without the danger of dragging the more or less destructible coil tube over the edge of the core. Also, delicate adjustment is possible in this machine in order to hold various size cores and their corresponding coil tubes. It is evident that this invention makes possible the utilization of improved transformer characteristics and structure for small transformers, heretofore not attainable. While the anti-friction device has been shown and described as a roller bearing device, it is within the purview of this invention to rotatably support the coil tube on the core having a minimum of friction between the core and the tube. In the very small type transformers, space precludes the insertion of mechanical means and this invention makes possible the use of such material as varnished glass cloth wound about the core itself so as to rotatably support the tube on the core with a minimum of friction.

While the invention has been described in considerable detail, it is to be limited only by the clear import of the following claims.

I claim:

1. Apparatus for winding an electrical coil upon a coil tube of insulating material encircling a winding leg of a closed magnetic core, comprising anti-friction means supported directly on said leg for revolubly supporting said tube about its longitudinal axis, synchronized drive rollers directly engaging the lateral edges at opposite ends of said tube in axial compressive relationship, and means for rotating said rollers.

2. Apparatus for winding an electrical coil upon a coil tube of insulating material encircling a cruciform in cross section winding leg of a closed magnetic core, comprising roller bearing means supported directly on the medial portion of said leg for revolubly supporting said tube about its longitudinal axis, and synchronized rotatable drive means directly engaging the lateral edges of said tube at opposite ends thereof in axial compressive relationship.

3. Apparatus for winding an electrical coil upon a coil tube of insulating material encircling a cruciform in cross section winding leg of a closed magnetic core, comprising a tubular shell of insulating material between said tube and said leg and snugly embracing said leg, said shell having a low coefficient of friction relative to said tube and revolubly supporting said tube about its longitudinal axis, and synchronized rotatable drive means directly engaging the lateral edges of said tube at opposite ends thereof in axial compressive relationship.

4. Apparatus for winding an electrical coil upon a coil tube of insulating material encircling a winding leg of a closed magnetic core, comprising roller bearing means between said tube and said leg revolubly supporting said tube throughout its length about its longitudinal axis, spring means supported on said leg for resiliently urging said bearing means against the inner periphery of said tube, and rotatable drive means directly engaging the lateral edges at opposite ends of said tube in axial compressive relationship.

5. Apparatus for winding a conducting coil upon a coil tube of insulating material encircling a cruciform in cross section winding leg of a closed magnetic core, comprising a pair of bearing blocks between said leg and said tube each having a plurality of bearing races extending the length of said tube, roller means in said races for rotatably supporting said tube about its longitudinal axis, spring means supported on the medial portion of said leg on opposite sides thereof for resiliently urging said bearing blocks and rollers against the inner periphery of said tube, and drive means directly engaging the lateral edges of said tube at opposite ends thereof in axial compressive relationship.

6. Apparatus in accordance with claim 5 and including means for preventing lateral shifting of said bearing blocks.

7. Apparatus for winding an electrical coil upon a coil tube of insulating material encircling a cruciform in cross section winding leg of a closed magnetic core, comprising a pair of roller bearings between said tube and said leg extending the length of said tube for revolubly supporting said tube about its longitudinal axis, said roller bearings being supported on opposite sides of said leg along the medial portion thereof, and rotatable drive means frictionally engaging the lateral edges of said tube at the opposite ends thereof.

8. Apparatus for winding an electrical coil upon a coil tube of insulating material encircling a cruciform in cross section winding leg of a closed magnetic core, comprising anti-friction means supported directly on the medial portion of said leg for rotatably supporting said tube throughout its length, and rotatable drive means frictionally engaging the lateral edges of said tube at the opposite ends thereof, said drive means being movable axially of said tube whereby the friction between said tube and said drive means may be adjusted to vary the tension with which said coil is wound, and means for locking said drive means in position relative to said tube.

9. Apparatus for winding an electrical coil upon a coil tube of insulating material encircling a cruciform in cross section winding leg of a closed magnetic core, comprising a base, releasable clamping means normally clamping said core on said base, anti-friction means between said leg and said tube carried on the medial portion of said leg for revolubly supporting said tube about its longitudinal axis, drive means rotatably mounted on said base and adapted to engage the lateral edges of said coil tube to effect rotation thereof, said clamping means being movable in three directions relative to said base when released, two of the directions being in parallel relation to the base and normal to each other, the other direction being vertically relative to said base, whereby said core may be adjusted to a position wherein said coil tube engages said drive means.

10. Apparatus for winding a conducting coil upon a coil tube of insulating material encircling a winding leg of a closed magnetic core, comprising a base, releasable clamping means normally clamping said core on said base, anti-friction means between said leg and said tube and supported directly upon said leg for revolubly supporting said tube about its longitudinal axis, a pair of support members releasably secured to said base at opposite ends of said tube, a drive roller rotatably mounted on each support member, said support members being movable axially of said tube when released to engage said rollers with the lateral edges of said tube, and means for rotating said drive rollers.

11. Apparatus for winding a conducting coil upon a coil tube of insulating material encircling a winding leg of a closed magnetic core, comprising a base, releasable clamping means normally clamping said core on said base, said means being releasably secured to said base and movable when released in three mutually orthogonal directions relative to said base, anti-friction means between said leg and said tube and supported on said leg for revolubly supporting said tube about its longitudinal axis, a pair of support members releasably secured to said base at opposite ends of said tube, a drive roller rotatably mounted on each support member, said support members being movable axially of said tube when released to engage said rollers with the lateral edges of said tube, and means for rotating said drive rollers.

References Cited in the file of this patent

UNITED STATES PATENTS

| Number | Name | Date |
|---|---|---|
| 2,305,999 | Steinmayer et al. | Dec. 22, 1942 |
| 2,334,131 | Schultz | Nov. 9, 1943 |
| 2,414,603 | Nelson | Jan. 21, 1947 |
| 2,441,439 | Nelson | May 11, 1948 |